US012643329B2

(12) United States Patent
Saeki et al.

(10) Patent No.: US 12,643,329 B2
(45) Date of Patent: Jun. 2, 2026

(54) RECORDING APPARATUS

(71) Applicant: CANON KABUSHIKI KAISHA, Tokyo (JP)

(72) Inventors: Tsuyoshi Saeki, Kanagawa (JP); Hideaki Matsumura, Tokyo (JP); Yuri Mori, Tokyo (JP); Ken Takenaga, Kanagawa (JP); Shota Asada, Tokyo (JP); Koki Shimada, Kanagawa (JP); Daiju Takeda, Kanagawa (JP); Hiromasa Tsutsumi, Kanagawa (JP); Mineyoshi Tomie, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 18/477,339

(22) Filed: Sep. 28, 2023

(65) Prior Publication Data

US 2024/0109331 A1 Apr. 4, 2024

(30) Foreign Application Priority Data

Sep. 30, 2022 (JP) ................................ 2022-158843

(51) Int. Cl.
*B41J 2/175* (2006.01)
*B41J 29/13* (2006.01)

(52) U.S. Cl.
CPC ....... *B41J 2/17536* (2013.01); *B41J 2/17509* (2013.01); *B41J 2/17553* (2013.01); *B41J 29/13* (2013.01)

(58) Field of Classification Search
CPC .... B41J 2/175; B41J 2/17503; B41J 2/17506; B41J 2/17509; B41J 2/17513; B41J 2/17536; B41J 2/17553; B41J 29/13
See application file for complete search history.

(56) References Cited

U.S. PATENT DOCUMENTS

| | | | | |
|---|---|---|---|---|
| 10,308,029 | B2 * | 6/2019 | Kudo | B41J 2/1754 |
| 2016/0089893 | A1 | 3/2016 | Osakabe et al. | |
| 2017/0355197 | A1 | 12/2017 | Kudo et al. | |
| 2018/0244063 | A1 * | 8/2018 | Okumura | B41J 2/17553 |
| 2018/0311964 | A1 | 11/2018 | Tanaka et al. | |
| 2022/0032629 | A1 * | 2/2022 | Maruyama | B41J 2/17553 |

FOREIGN PATENT DOCUMENTS

| | | | |
|---|---|---|---|
| CN | 107487082 | A | 12/2017 |
| CN | 114055947 | A | 2/2022 |
| JP | H11198391 | A | 7/1999 |
| JP | 2001044110 | A | 2/2001 |
| JP | 2002052741 | A | 2/2002 |
| JP | 2018069705 | A | 5/2018 |
| WO | 2019078899 | A1 | 4/2019 |

* cited by examiner

*Primary Examiner* — Anh T Vo
(74) *Attorney, Agent, or Firm* — Canon U.S.A., Inc. IP Division

(57) ABSTRACT

Disclosed is a recording apparatus including a tank configured to store liquid to be supplied to a recording head that ejects the liquid, the tank including an inlet port for liquid injection; a cap unit including a shaft portion and a cap configured to turn about the shaft portion between a first position at which the cap caps the inlet port and a second position at which the cap does not cap the inlet port, the shaft portion being provided to a housing that encloses the tank; and a biasing unit configured to bias the cap unit in a direction to move the cap apart from the inlet port, wherein the cap unit does not move at the second position while being biased by the biasing unit.

14 Claims, 12 Drawing Sheets

RECORDING APPARATUS

BACKGROUND OF THE DISCLOSURE

Field of the Disclosure

The present disclosure relates to a recording apparatus.

Description of the Related Art

There is an ink jet recording apparatus that allows a user to inject ink into an ink container coupled via a supply tube to a recording head that ejects the ink. In a case where the user takes off a cap capping an inlet port of the ink container in order to inject the ink, it is desirable that the cap should not be easily touched by the user because the cap may be contaminated with the ink. Japanese Patent Laid-open No. 2018-69705 (hereinafter referred to as Document 1) discloses a technique for capping and uncapping an inlet port of an ink container by using a cap unit including a cap and a lever. The cap unit is turnably attached to a housing that encloses the ink container. In a capping posture, the cap caps the inlet port of the ink container. Meanwhile, in an uncapping posture, the cap is located apart from the inlet port of the ink container as a result of changing the cap unit from a straight posture to a bent posture by use of a biasing unit, and thereby uncaps the inlet port.

However, in the technique disclosed in Document 1, the cap unit cannot maintain the capping posture unless the lever is restricted by a pressing portion or a posture keeping mechanism. Therefore, unless the lever is restricted by the pressing portion or the posture keeping mechanism, the cap unit may be bent to generate a gap between the cap and the inlet port of the ink container and thereby cause the ink to leak or evaporate. In addition, even if the inlet port is uncapped to replenish the ink container with the ink, the cap unit may return to the capping posture due to a self-weight of the cap unit in a case where an elevation angle of the lever is in a range below 90 degrees.

SUMMARY OF THE DISCLOSURE

An embodiment of the present disclosure is a recording apparatus including a tank configured to store liquid to be supplied to a recording head that ejects the liquid, the tank including an inlet port for liquid injection; a cap unit including a shaft portion and a cap configured to turn about the shaft portion between a first position at which the cap caps the inlet port and a second position at which the cap does not cap the inlet port, the shaft portion being provided to a housing that encloses the tank; and a biasing unit configured to bias the cap unit in a direction to move the cap apart from the inlet port, wherein the cap unit does not move at the second position while being biased by the biasing unit.

Further features of the present disclosure will become apparent from the following description of exemplary embodiments with reference to the attached drawings.

DESCRIPTION OF THE EMBODIMENTS

Hereinafter, embodiments of the present disclosure will be described in details in reference to the accompanying drawings. It should be noted that the following embodiments are not intended to limit the disclosure according to claims. Although multiple features are described in each of the embodiments, not all of these multiple features are essential to the disclosure, and some of the features may be combined as needed. In addition, in the accompanying drawings, the same or similar constituent elements will be designated with the same reference sign, and repetitive description thereof will be omitted in some cases.

In the present disclosure, "recording" refers to forming meaningful information such as characters and graphics. In addition to the above definition, "recording" also broadly refers to forming an image, a design, a pattern, or the like on a recording medium or processing a medium regardless of whether it is meaningful or not and also regardless of whether or not it becomes obvious so that humans can perceive it visually. Also, "recording" is sometimes called "character printing" or "printing".

Moreover, the term a "recording medium (sheet)" includes not only recording paper for use in general image forming apparatuses, but also a wide range of conveyable media such as cloth, plastic film (OHP), metal plate, glass, ceramics, wood, and leather.

In addition, "ink" should be interpreted broadly as in the above definition of "recording (printing)", and refers to a liquid that is usable by being applied to a recording medium to form an image, a design, a pattern, or the like or to process the recording medium or that is usable for ink treatment. The "ink" is sometimes called a "liquid". The "ink treatment" refers to, for example, solidification or insolubilization of a coloring material in the ink to be applied to a recording medium.

In the following description, an axis in a main scanning direction of a carriage is defined as an X axis, an axis in a conveyance direction of a recording medium is defined as a Y axis, and an axis in a direction normal to a plane on which a recording apparatus is installed is defined as a Z axis.

First, an outline of an ink jet recording apparatus according to a present embodiment will be described.

Figure 1:
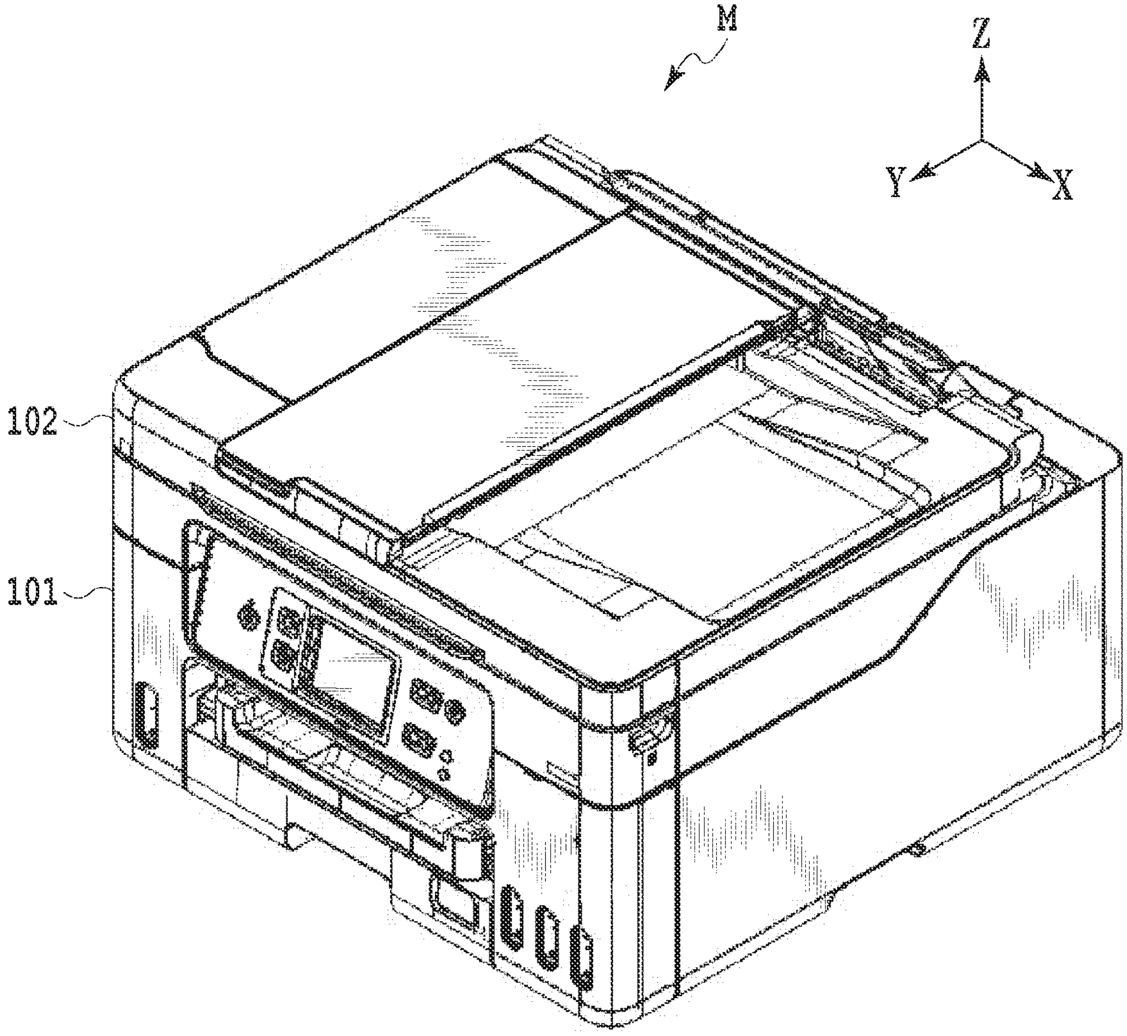
FIG. 1 is a perspective view of an ink jet recording apparatus according to a present embodiment in a state where a cover is closed and a housing is not removed.
Figure 2:
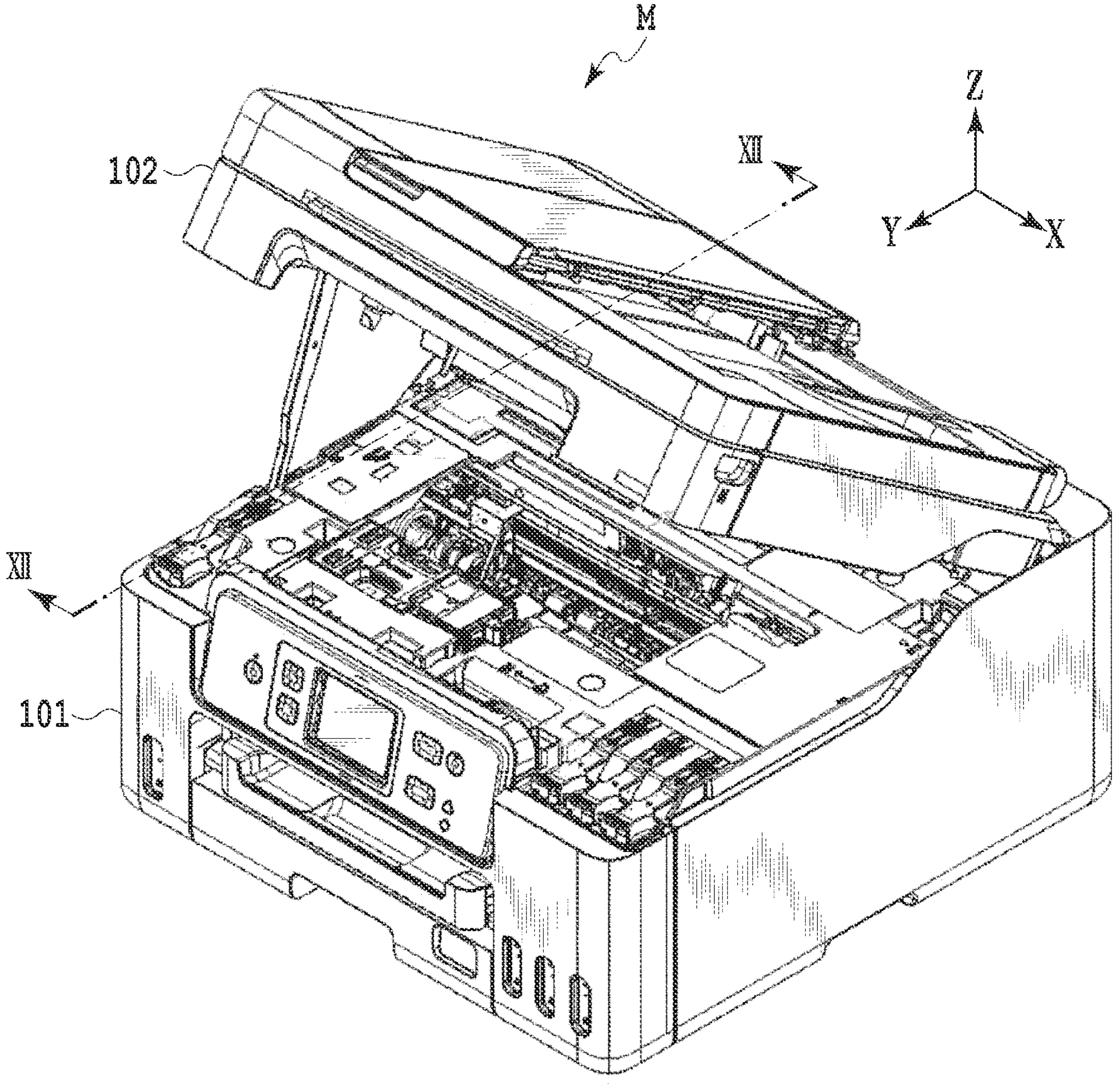
FIG. 2 is a perspective view of the ink jet recording apparatus according to the present embodiment in a state where the cover is opened and the housing is not removed.
Figure 3:
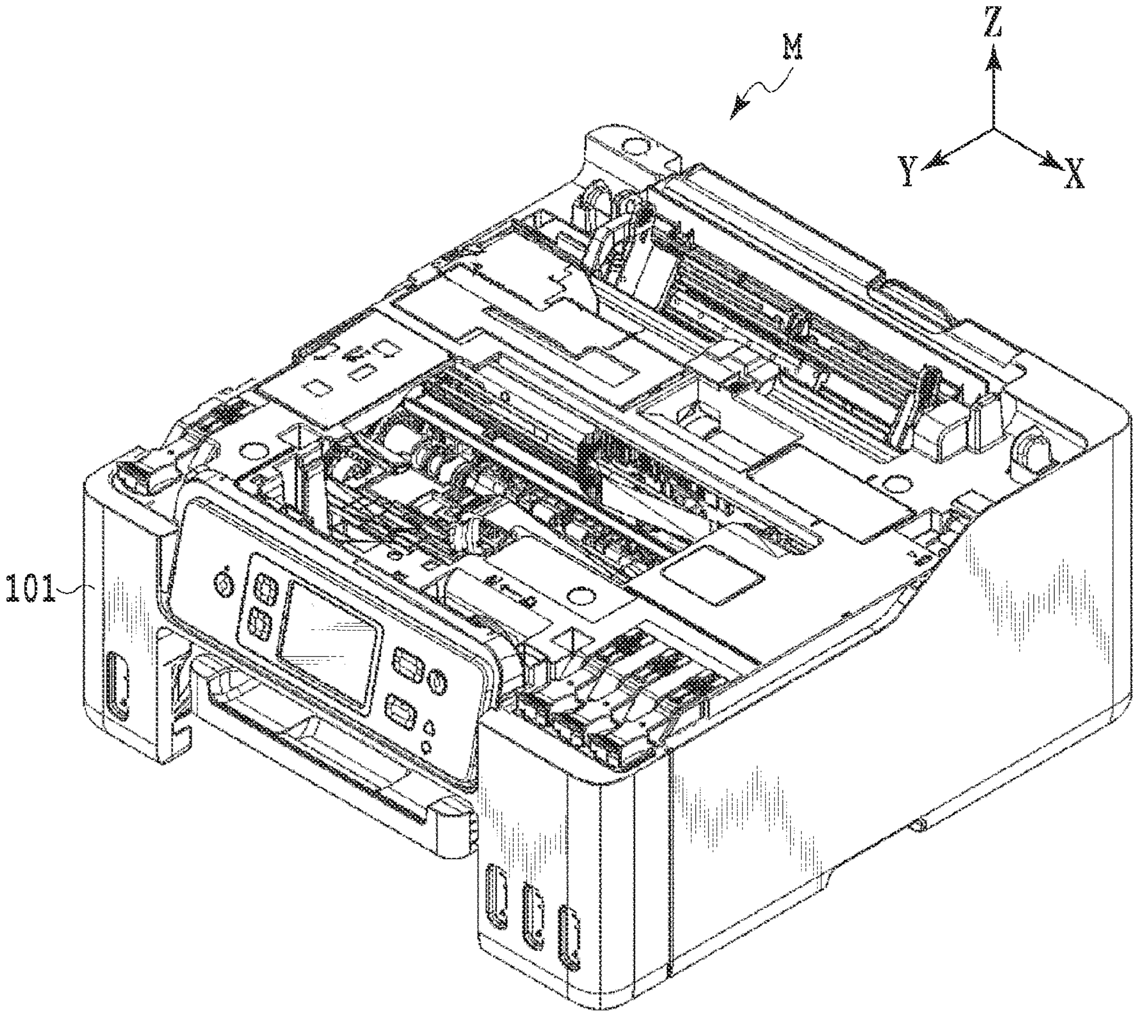
FIG. 3 is a perspective view of the ink jet recording apparatus according to the present embodiment in a state where the cover is removed and the housing is not removed.
Figure 4:
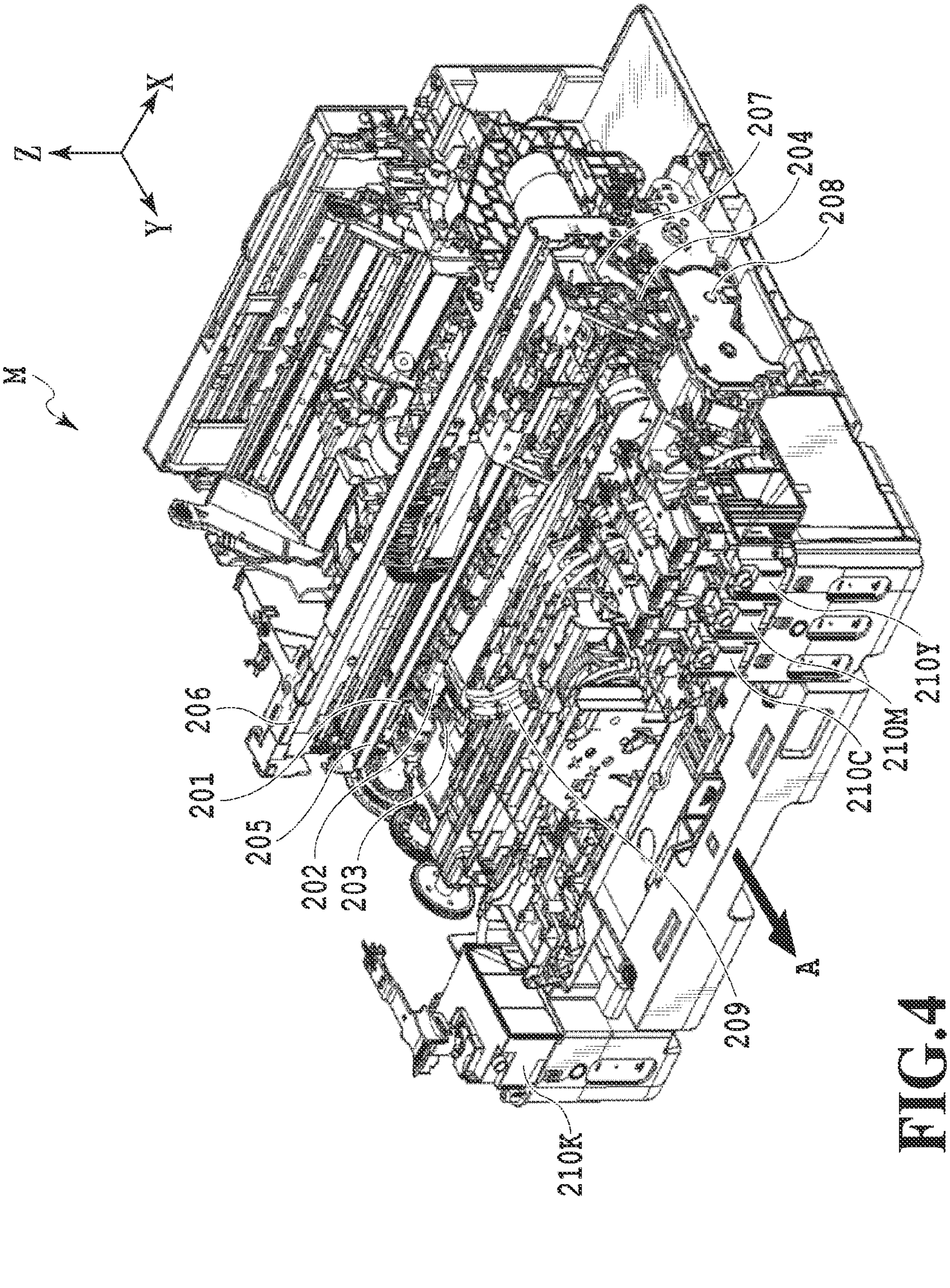
FIG. 4 is a perspective view of the ink jet recording apparatus according to the present embodiment in a state where the cover and the housing are removed.

FIGS. 1 to 4 are perspective views illustrating the ink jet recording apparatus according to the present embodiment. FIG. 1 illustrates an ink jet recording apparatus M in a state where a cover 102 is closed and a housing 101 is not removed, and FIG. 2 illustrates the ink jet recording apparatus in a state where the cover 102 is opened and the housing 101 is not removed. FIG. 3 illustrates the ink jet recording apparatus in a state where the cover 102 is removed and the housing 101 is not removed, and FIG. 4 illustrates the ink jet recording apparatus in a state where the cover 102 and the housing 101 are removed.

With reference to FIG. 4, in the process of ink jet recording, a recording medium is fed by a feed roller (not illustrated) and is pinched between a conveyance roller 201 and pinch rollers 202 driven by the conveyance roller 201. With rotation of the conveyance roller 201, the recording medium is guided onto a platen 203 and is conveyed in an arrow A direction in FIG. 4 while being supported by the platen 203. The conveyance roller 201 is a metal roller processed such that fine asperities are formed on its surface so as to generate a great frictional force. The pinch rollers 202 are elastically biased to the conveyance roller 201 by a pressing unit (not illustrated) such as a spring. The platen 203 supports the back surface of the recording medium so that a distance between an ink ejection surface of a recording head 204 and a surface of the recording medium facing the recording head 204 can be maintained at a constant or predetermined distance. The recording medium conveyed onto the platen 203 is then conveyed by being pinched between a discharge roller (not illustrated) and a spur roller, which is a rotating body driven by the discharge roller. The discharge roller is a rubber roller having a high frictional coefficient. The spur roller is elastically biased to the discharge roller by a pressing member (not illustrated) such as a spring. After image recording is executed, the recording medium is discharged with rotation of the discharge roller from the platen 203 to the outside of the apparatus. On a carriage 207 that is reciprocated along guide rails 205 and 206 arranged vertically side by side by a driving unit such as a motor, the recording head 204 is detachably mounted in a posture capable of ejecting inks toward a recording medium. The movement direction of the carriage is a direction crossing the conveyance direction of the recording medium (the arrow A direction) and is referred to as a main scanning direction. Meanwhile, the conveyance direction of the recording medium is referred to as a sub scanning direction.

In particular, the recording head 204 of an ink jet recording system includes a unit to generate heat energy as energy for use to eject the ink (for example, a heating resistance element). The recording head 204 of the ink jet recording system uses the heat energy to cause a change in the state of the ink (film boiling), thereby achieving high density and high definition recording. In place of the recording head of the aforementioned system using the heat energy, a recording head of a system using a vibration energy may be used.

A recovery unit 208 is arranged so as to face the ink ejection surface of the recording head 204 in a non-recording area which is within a range of reciprocating movement of the recording head 204 and is outside a range which the recording medium passes while being conveyed. The recovery unit 208 has a head cap for capping the ink ejection surface of the recording head 204 and a suction mechanism for forcibly sucking the ink from the recording head 204 with the ink ejection port surface capped. The recovery unit 208 also has a cleaning blade or the like for wiping off stains on the ink ejection surface. The recording head 204 is provided with multiple nozzle arrays for ejecting the inks, and ink tanks 210 (210C, 210M, 210Y, and 210K) for respective colors of inks to be ejected (equivalent to a "tank" of the present disclosure) are fixed to an apparatus main body. The ink tanks 210C, 210M, and 210Y are common components, whereas the ink tank 210K is different in size from the other ink tanks, but has the same basic structure. The ink tanks 210C, 210M, 210Y, and 210K are coupled to the recording head 204 via supply tubes 209 individually, and independently supply the inks of the colors stored in the ink tanks 210 to the corresponding nozzle arrays of the recording head 204.

Figure 5:
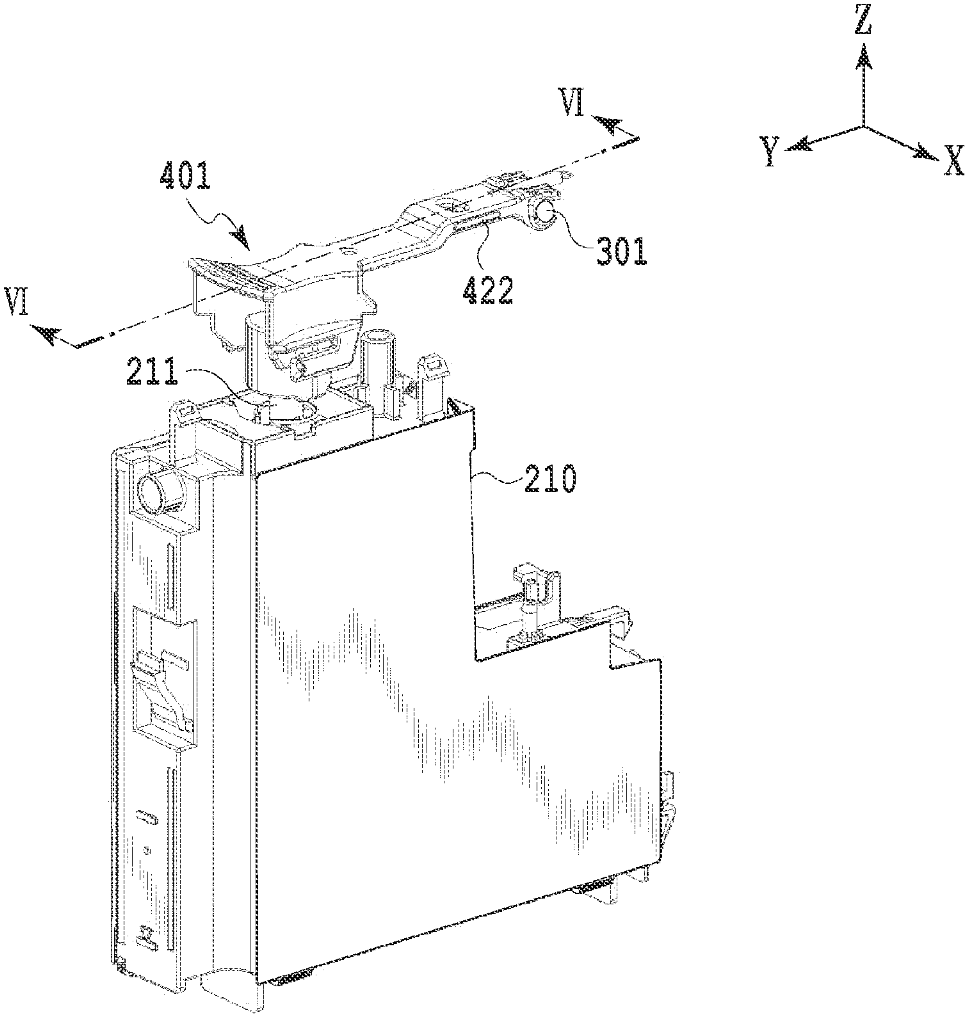
FIG. 5 is a perspective view illustrating an ink tank and a cap unit in the present embodiment.

Next, the details of the ink tank 210 will be described. FIG. 5 is a perspective view of the ink tank 210 and peripheral parts of the ink tank 210. An inlet port 211 for ink injection is provided in an upper portion of the ink tank 210. A cap unit 401 capable of uncapping and capping is prepared for the inlet port 211. The cap unit 401 is supported in a manner turnable about an axial center of a turning shaft 301 fixed to the housing 101. Here, the turning shaft 301 may be attached to the housing 101 in a turnable manner.

Figure 6:
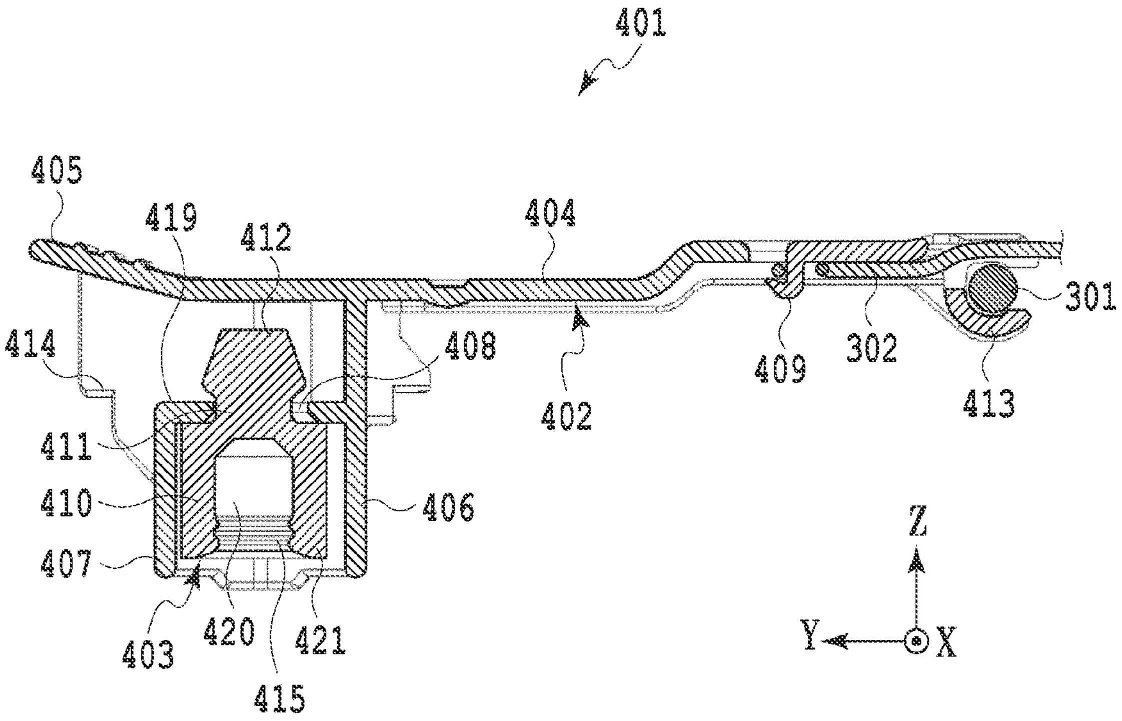
FIG. 6 is a cross-sectional view of the cap unit taken along VI-VI in FIG. 5.

FIG. 6 illustrates a cross-sectional view of the cap unit 401 taken along VI-VI in FIG. 5. The cap unit 401 includes a cap 403 and a lever 402 that can be grasped by a user.

The lever 402 includes a long lever body portion 404, a grip portion 405, a bracket portion 406, and a cap holding portion 407. The lever body portion 404 is provided with a hook portion 409.

At a capping position, the grip portion 405 is oriented obliquely to an upper front side (obliquely to an upper left side in FIG. 6) as seen from the front side of the main body, and has a corrugated top surface, so that the user can easily grasp the grip portion 405. One end of a biasing unit 302 to be described later is hooked on the hook portion 409.

The cap 403 includes a hollow cylindrical cap body portion 410 with its upper side closed, a neck portion 411 provided to be connected to the cap body portion 410, and a head portion 412 provided to be connected to the neck portion 411.

A hole 408 is provided in a top surface 419 of the cap holding portion 407, and the neck portion 411 of the cap 403 is loosely fitted in the hole 408.

As described above, the cap unit 401 is attached in a manner turnable about the axial center of the turning shaft 301 of the housing 101. Specifically, a bearing portion 413 that is provided at a rear end portion of the lever 402 and that has a C-shaped cross section holds the turning shaft 301 in a turnable manner. Instead, a turning shaft may be provided to the cap unit 401 and a bearing may be provided to the housing 101.

The cap 403 is made of an elastic material such as a rubber or elastomer, and caps is fitted to the inlet port 211 (see FIGS. 5 and 7B) provided to the ink tank 210 when the cap unit 401 is at the capping position. In addition, a corrugated lip portion 415 is provided near an end of an inner circumferential surface 420 of the cap body portion 410, and seals the inlet port 211 with elastic deformation of the lip portion 415 when the cap unit 401 is at the capping position. Thus, when the cap unit 401 is at the capping position, it is possible to prevent leakage of ink from the inlet port 211 and suppress evaporation of ink from the inlet port 211.

Figure 7A:
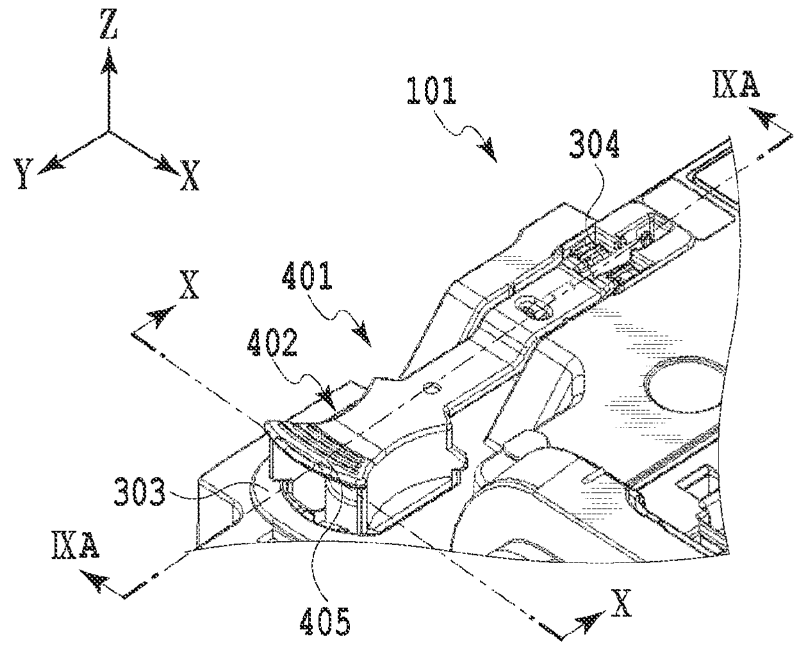
FIGS. 7A and 7B are perspective views illustrating the cap unit and its surrounding area at a capping position and at an uncapping position, respectively.
Figure 7B:
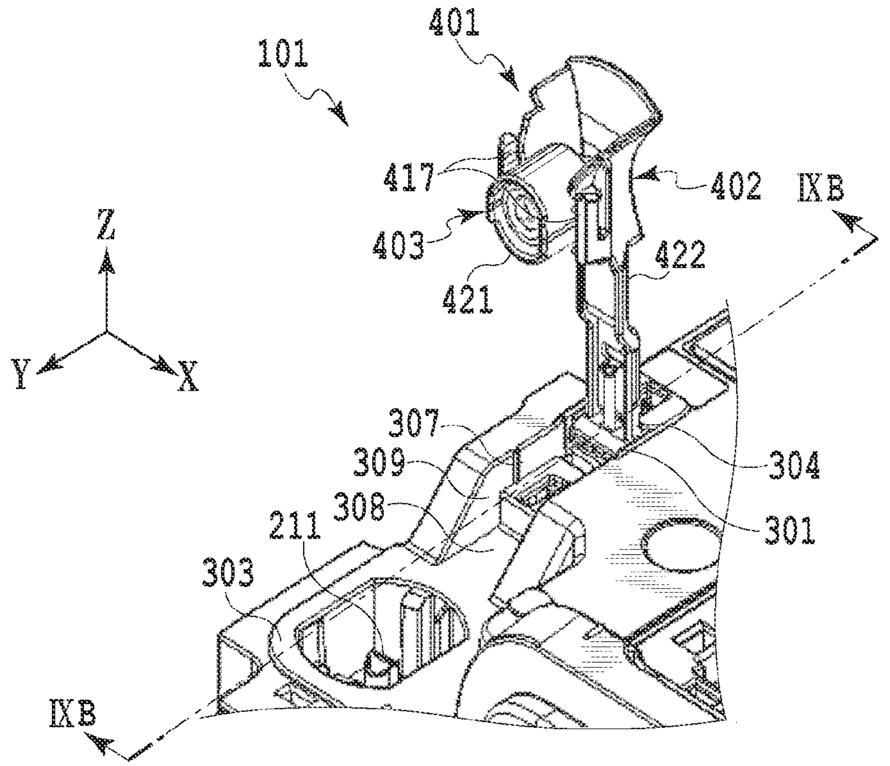

FIGS. 7A and 7B illustrate states where the cap unit 401 is attached to the housing 101. The cap unit 401 is turnable within a range from the capping position illustrated in FIG. 7A to the uncapping position illustrated in FIG. 7B. When the cap unit 401 is at the capping position, a lower end 414 (see FIG. 6) located below the grip portion 405 is in contact with a first restriction portion 303 (see FIG. 7A) provided to the housing 101. When the cap unit 401 is at the uncapping position, a pair of ridges 416 (see FIG. 8) provided to the lever body portion 404 are in contact with a pair of second restriction portions 304 (see FIGS. 7A, 7B, and 8) provided to the housing 101.

Figure 9A:
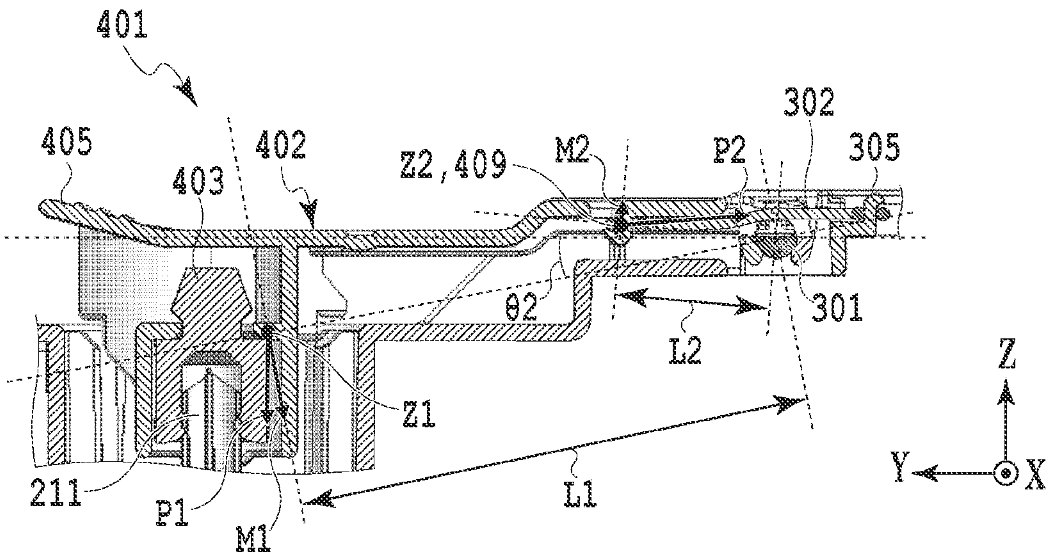
FIG. 9A is a cross-sectional view taken along IXA-IXA in FIG. 7A
Figure 9B:
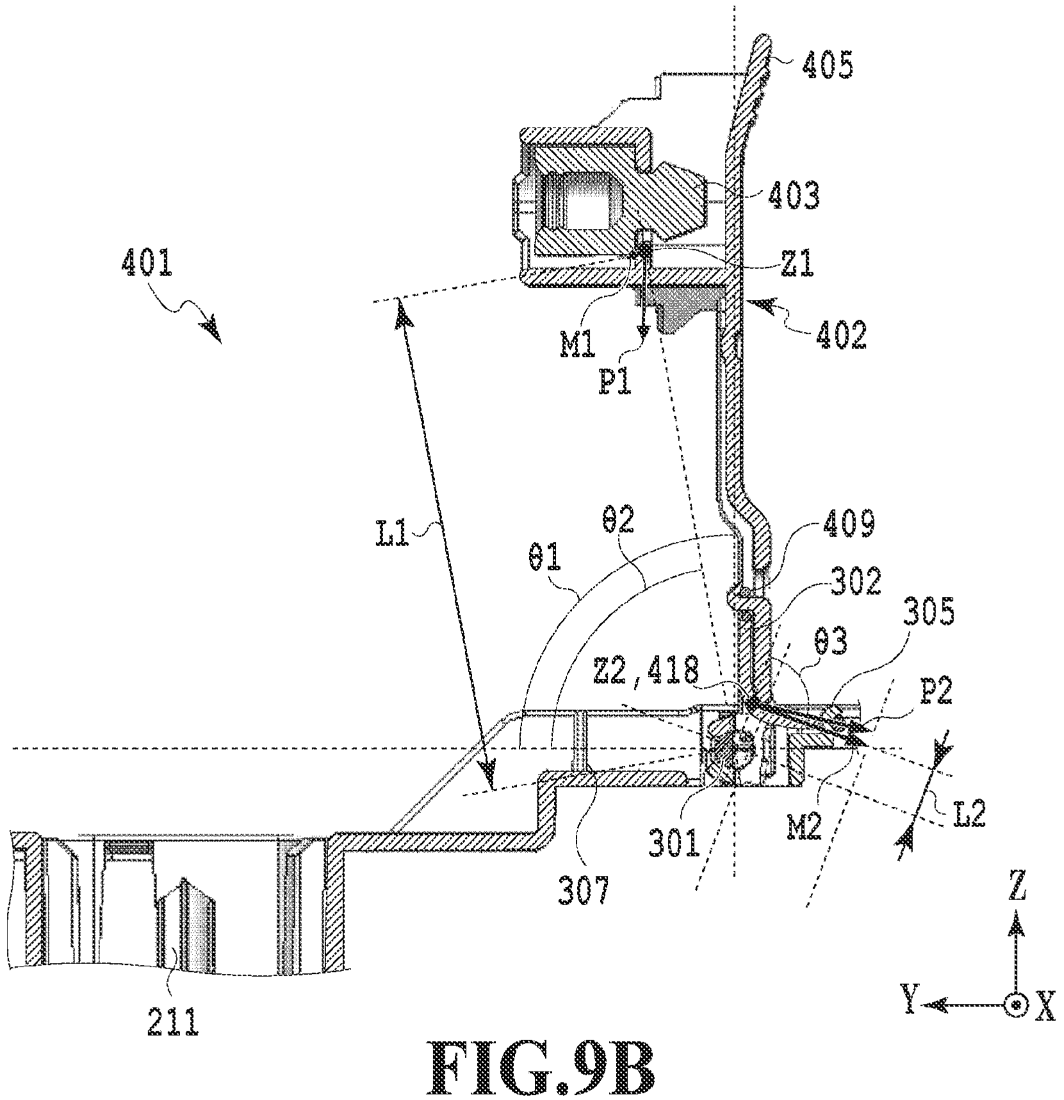
FIG. 9B is a cross-sectional view taken along IXB-IXB in FIG. 7B.

With reference to FIGS. 9A and 9B, in a case where an opening angle θ1 of the cap unit 401 at the capping position is defined as zero degrees, the opening angle θ1 of the cap unit 401 at the uncapping position is about 90 degrees.

Figure 10:
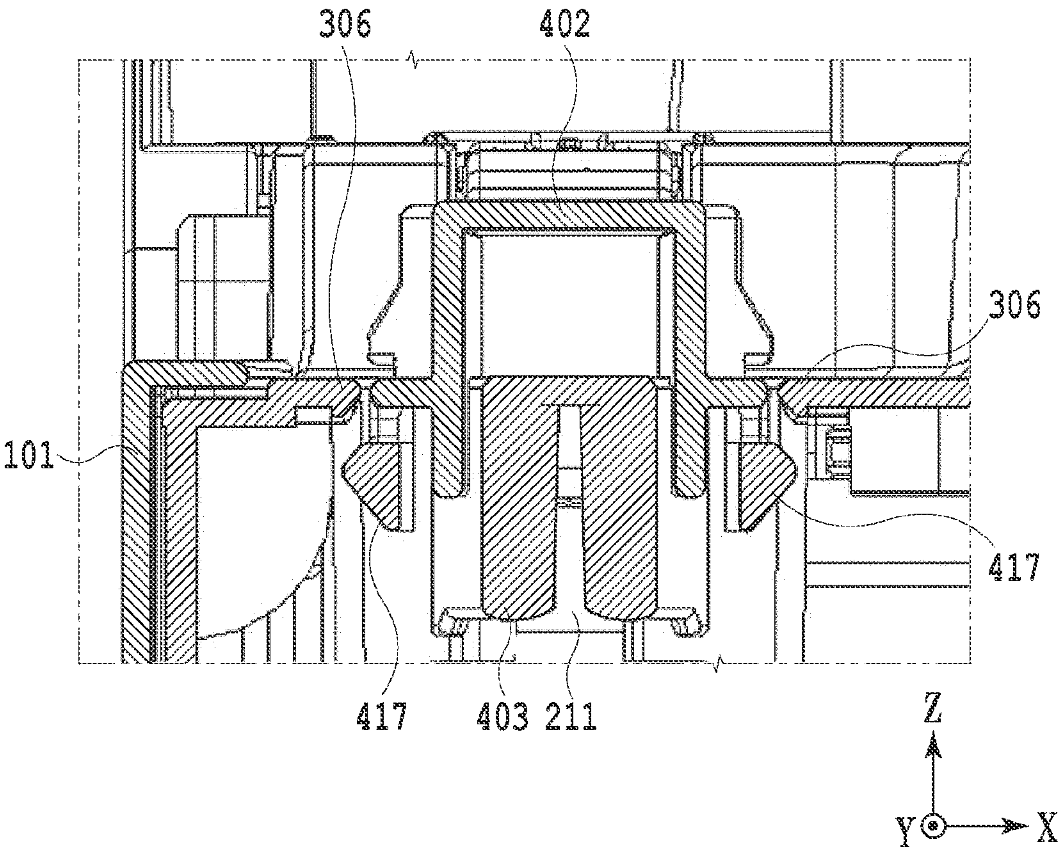
FIG. 10 is a cross-sectional view taken along X-X in FIG. 7A.

With reference to FIGS. 7B and 10 (a cross-sectional view taken along X-X in FIG. 7A), a pair of engagement portions 417 are provided near a tip of the cap unit 401. As illustrated in FIG. 7B, the pair of engagement portions 417 have leaf spring portions and can be elastically deformed so as to come close to each other.

With reference to FIG. 10, a pair of engagement portions 306 are provided to the housing 101 at positions sandwiching the cap unit 401 from both sides.

In a course of turning the cap unit 401 from the uncapping position to the capping position and in a course of turning the cap unit 401 from the capping position to the uncapping position, the pair of engagement portions 417 engage with the pair of engagement portions 306 near the capping position, and with this engagement, it is possible to give a click feeling to the user. Therefore, the user can easily recognize that the cap unit 401 is turned to the capping position.

FIGS. 9A and 9B are a cross-sectional view taken along IXA-IXA in FIG. 7A and a cross-sectional view taken along IXB-IXB in FIG. 7B, respectively. FIG. 9A illustrates a state where the cap unit 401 is at the capping position and FIG. 9B illustrates a state where the cap unit 401 is at the uncapping position.

As illustrated in FIGS. 7A and 9A, the user can grasp and lift up the grip portion 405 of the cap unit 401 at the capping position. As a result, the cap unit 401 can be turned to the uncapping position as illustrated in FIG. 9B. Here, as will be described below, if the user lifts up the grip portion 405 until the opening angle θ1 reaches a predetermined angle, then the cap unit 401 automatically turns to the uncapping position.

Figure 8:
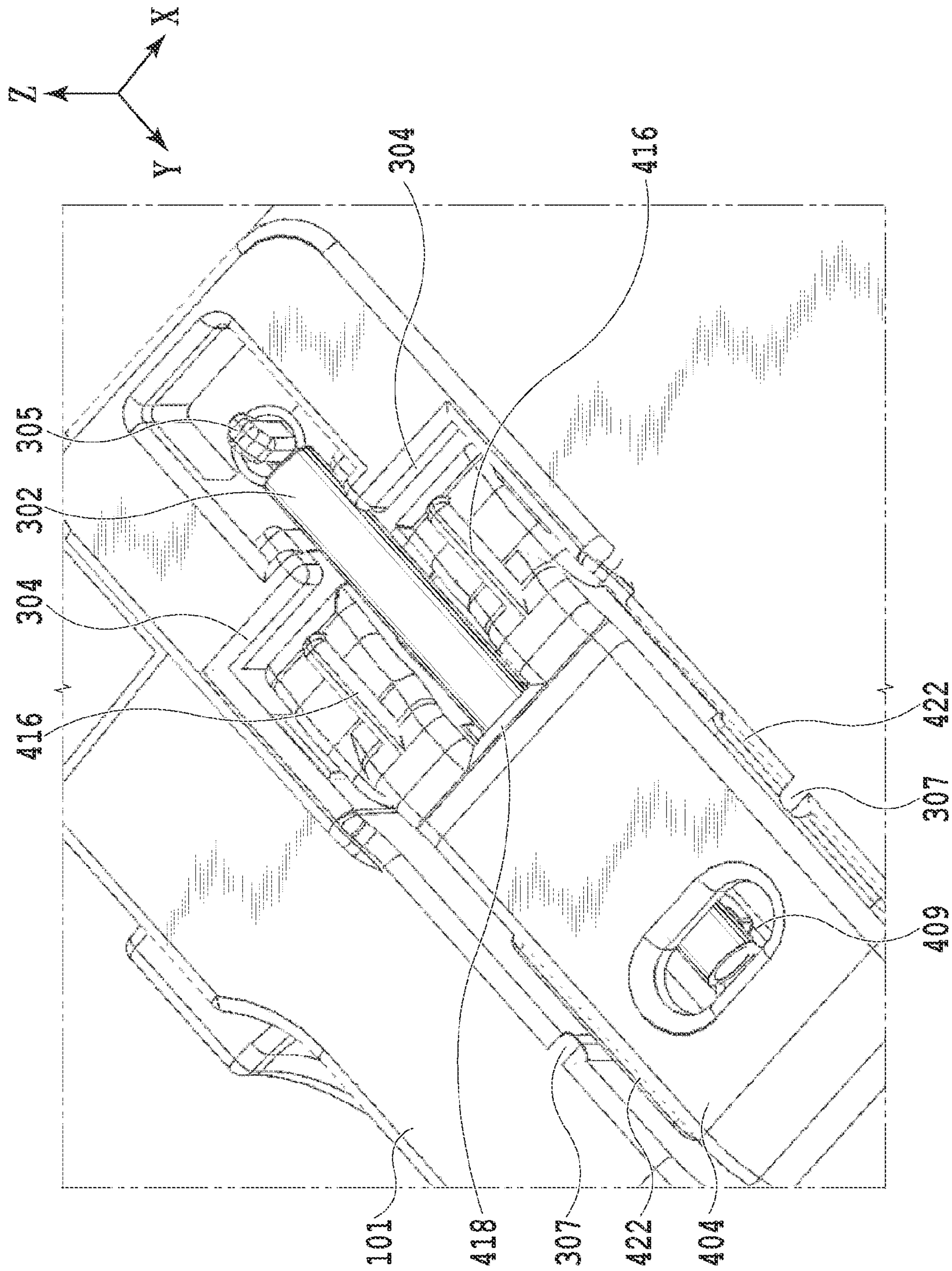
FIG. 8 is an enlarged perspective view of the cap unit and its surrounding area at the capping position.

As illustrated in FIG. 8, the biasing unit 302 is stretched between the hook portion 409 provided to the lever body portion 404 of the cap unit 401 and a hook portion 305 provided to the housing 101. The biasing unit 302 applies, to the hook portion 409, force to bring the hook portion 409 close to the hook portion 305. As the biasing unit 302, for example, a tension spring is used. As illustrated in FIGS. 9A and 9B, the hook portion 305 is arranged at a position behind, or deeper than, the axial center of the turning shaft 301 in the Y direction (depth direction) (to the right in FIGS. 9A and 9B). Meanwhile, the hook portion 305 is arranged at a position above the axial center of the turning shaft 301 in the Z direction (height direction) (also above in FIGS. 9A and 9B). Therefore, on the YZ plane, a turning-direction component of a vector of a force applied to the hook portion 409 by the biasing unit 302 has a direction from the capping position toward the uncapping position. As a result, as illustrated in FIGS. 9A and 9B, a moment M2 of a force P2 applied to the hook portion 409 by the biasing unit 302 with respect to the axial center of the turning shaft 301 has a direction corresponding to an uncapping direction.

On the other hand, as illustrated FIGS. 9A and 9B, a moment M1 of a force P1 due to a self-weight of the cap unit 401 with respect to the axial center of the turning shaft 301 has a direction corresponding to a capping direction.

In addition, as illustrated in FIG. 8, the cap unit 401 includes a pair of ridges 422 protruding in directions toward both outer sides from the center in a width direction. The ridges 422 extend in a longitudinal direction of the cap unit 401. Further, as illustrated in FIG. 8, a pair of ridges 307 are provided on both side surfaces 309 (see FIG. 7B) of a recess 308 (see FIG. 7B) for housing the cap unit 401 in the housing 101. The pair of ridges 307 protrude in directions from both outer sides toward the center in the width direction and extend in the turning direction of the cap unit 401. When the cap unit 401 is located near the capping position, the pair of ridges 422 are held between the pair of ridges 307. Thus, the position of the cap unit 401 in the width direction is restricted when the cap unit 401 is located near the capping position.

With reference to FIG. 9A, the following matters are understood. Specifically, at the capping position, the moment M2 of the force P2 applied to the hook portion 409 by the biasing unit 302 with respect to the axial center of the turning shaft 301 is smaller in absolute value than the moment M1 of the force P1 due to the self-weight of the cap unit 401 with respect to the axial center of the turning shaft 301. Accordingly, at the capping position, a combined moment M3 obtained by combining the moment M1 and the moment M2 has a direction corresponding to the capping direction.

As will be described in detail later, as the cap unit 401 at the capping position is turned toward the uncapping direction, the combined moment M3 gradually approaches to zero. Then, as the cap unit 401 is further turned toward the uncapping direction, the combined moment M3 comes to have a direction corresponding to the uncapping direction. Therefore, as described above, if the user lifts up the grip portion 405 until the opening angle θ1 reaches the predetermined angle (that is, the angle at which the combined moment M3 becomes zero), then the cap unit 401 automatically turns to the uncapping position.

Here, as the opening angle θ1 (see FIG. 9B) of the cap unit 401 increases, a degree to which the grip portion 405 protrudes frontward (to the +Y side (see FIGS. 9A and 9B)) from the cap 403 decreases. Further, when the opening angle θ1 exceeds the predetermined angle, the cap 403 protrudes frontward from the grip portion 405. Although not illustrated, when the opening angle θ1 exceeds about 30 degrees, the cap 403 protrudes frontward from the tip of the grip portion 405, and the degree of this protrusion increases as the opening angle θ1 increases. Meanwhile, a lower end surface 421 of the cap 403 to which ink may adhere faces downward at the capping position, but comes to face frontward as the opening angle θ1 increases. Moreover, the inner circumferential surface 420 of the cap 403 including the lip portion 415 is hidden at the capping position, but comes to be exposed to the front side as the opening angle θ1 increases. Accordingly, as the opening angle θ1 of the cap unit 401 increases, the possibility a user touches the inner circumferential surface 420 or the lower end surface 421 of the cap 403 becomes higher, or the possibility that ink adheres to user's fingers becomes higher. However, in the present embodiment, in order to turn the cap unit 401 to the uncapping position, the user does not have to lift up the cap unit 401 according to the present embodiment until the opening angle θ1 becomes large. The user may move his/her fingers off the grip portion 405 when the cap unit 401 is turned to a certain degree from the capping position. This makes it possible to reduce the possibility that user's fingers touches the cap 403 to the minimum degree.

In a case of replenishing ink, the opening angle θ1 of the cap unit 401 is already around 90 degrees, and the distance from the inlet port 211 to the cap 403 is maximized. Therefore, also in the replenishment of ink, it is possible to reduce the possibility that the user's fingers touch the cap 403 to the minimum degree.

In addition, in the course of replenishing ink, the cap unit 401 is prevented from moving down and decreasing the opening angle θ1. Therefore, also in the replenishment of ink, the possibility that user's fingers touch the cap 403 is reduced to the minimum degree.

Here, given that the axial center of the turning shaft 301 is a reference, a magnitude of the moment M1 of force generated by the self-weight P1 is expressed by the following formula.

$$M1 = L1 \times P1 \times \cos\theta 2$$

In the above formula, L1 denotes a distance from the axial center of the turning shaft 301 to the center of gravity Z1 of the cap unit 401. Then, θ2 denotes an angle formed between a horizontal line and a straight line connecting the axial center of the turning shaft 301 and the center of gravity Z1.

The moment M1 of force acts in a direction to move the cap unit 401 from the uncapping position to the capping position.

Meanwhile, given that the axial center of the turning shaft 301 is a reference, a magnitude of the moment M2 of force generated by the biasing unit 302 is expressed by the following formula.

$$M2 = L2 \times P2 \times \cos(90^\circ - \theta 3)$$

In the above formula, L2 denotes a distance from the axial center of the turning shaft 301 to an action point Z2 of the biasing unit 302 on the cap unit 401. Then, θ3 denotes an angle formed between a straight line connecting the axial center of the turning shaft 301 and the action point Z2 and a vector of a biasing force P2.

The moment M2 of force acts in a direction to move the cap unit 401 from the capping position to the uncapping position.

Here, the action point Z2 changes as follows. As illustrated in FIG. 9A, when the cap unit 401 is at the capping position (the opening angle θ1 is zero degrees), the biasing unit 302 is linearly stretched between the hook portion 409 and the hook portion 305, and the action point Z2 is located on the hook portion 409. As illustrated in FIG. 9B, when the cap unit 401 is at the uncapping position (the opening angle θ1 is about 90 degrees), the biasing unit 302 is stretched between the hook portion 409 and the hook portion 305. However, the biasing unit 302 is bent at an opening edge portion 418 of the lever body portion 404 (see also FIG. 8). Therefore, the action point Z2 is located on the opening edge portion 418. Also when the cap unit 401 is at another turning position (the opening angle θ1) (in other words, the cap unit 401 is turned to a half-opened position), the action point Z2 is located on the opening edge portion 418 as long as the biasing unit 302 is bent at the opening edge portion 418.

Figure 11:
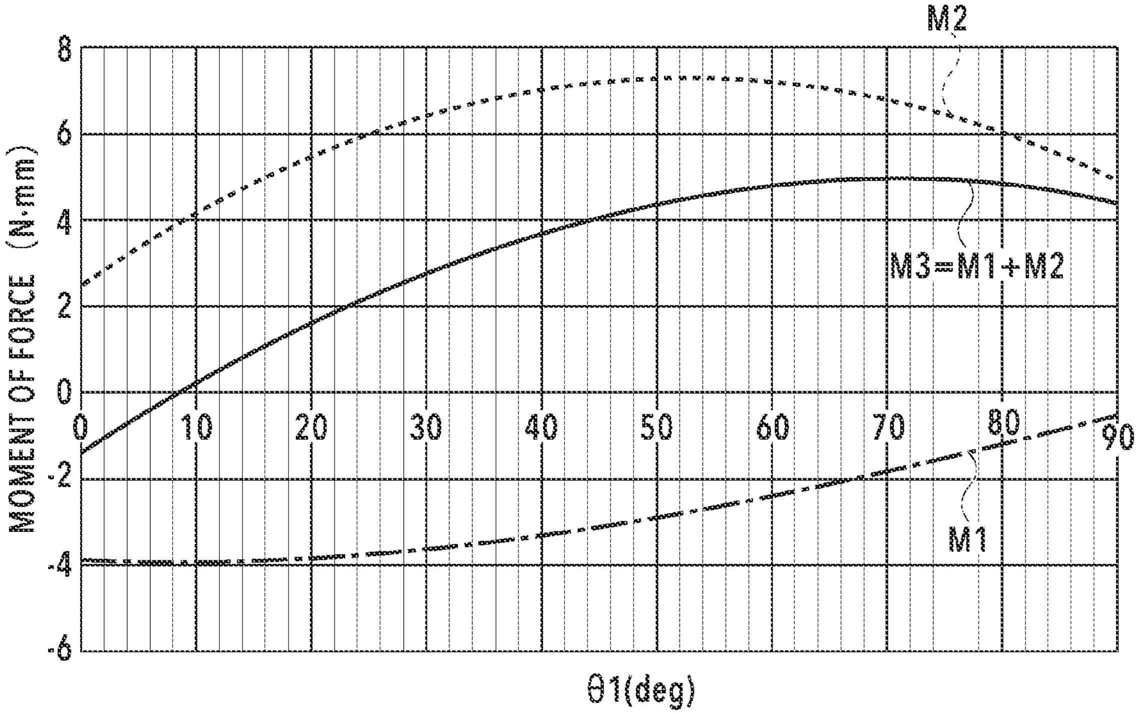
FIG. 11 is a graph presenting a relationship between an opening angle of the cap unit and moments of forces in the embodiment.

FIG. 11 presents a graph about a relationship between the opening angle θ1 of the cap unit 401 and the directions and the magnitudes of the moments M1 and M2 of force. This graph is drawn using empirical formulas based on actual measurements. In the graph, if the moment of force is minus (negative), the moment of force acts in the direction from the uncapping position toward the capping position. In the graph, if the moment of force is plus (positive), the moment of force acts in the direction from the capping position toward the uncapping position.

The sign of the moment M1 is minus in an opening angle θ1 range from zero degrees to 90 degrees. The absolute value of the moment M1 monotonically decreases as the opening angle θ1 increases from zero degrees to 90 degrees.

The sign of the moment M2 is plus in an opening angle θ1 range from zero degrees to 90 degrees. The absolute value of the moment M2 monotonically increases as the opening angle θ1 increases from zero degrees to about 50 degrees. Then, the absolute value of the moment M2 monotonically decreases as the opening angle θ1 increases from about 50 degrees to 90 degrees.

The absolute value of the moment M1 is larger than the absolute value of the moment M2 in an opening angle θ1 range from zero degrees to about 9 degrees. At the opening angle θ1 of about 9 degrees, the absolute value of the moment M1 is equal to the absolute value of the moment M2. The absolute value of the moment M1 is smaller than the absolute value of the moment M2 in an opening angle θ1 range from about 9 degrees to 90 degrees.

Accordingly, the combined moment M3 obtained by combining the moment M1 and the moment M2 has a negative value at the opening angle θ1 of zero degrees. The combined moment M3 is zero at the opening angle θ1 of about 9 degrees. The combined moment M3 monotonically increases in an opening angle θ1 range from zero degrees to about 9 degrees.

The combined moment M3 has the maximum value at the opening angle θ1 of about 70 degrees. The combined moment M3 monotonically increases in a range where the combined moment M3 starts from zero and increases to the maximum value. Accordingly, the combined moment M3 monotonically increases in an opening angle θ1 range from zero degrees to θ1$p$, where θ1$p$ denotes the opening angle θ1 at which the combined moment M3 is maximum. Then, the combined moment M3 monotonically decreases in an opening angle θ1 range above θ1$p$.

Here, the numeric values of the opening angle θ1 and the moments M1, M2, and M3 described in FIG. 11 are just examples, and may be changed to other numeric values.

In addition, the combined moment M3 may monotonically increase until the opening angle θ1 reaches nearly 90 degrees. Moreover, if the combined moment M3 becomes a predetermined positive numeric value when the opening angle θ1 reaches a certain angle, the combined moment M3 may keep the numeric value in an opening angle θ1 range above the certain angle.

In the example in FIG. 11, the opening angle θ1 at which the pair of engagement portions 417 provided in the cap unit 401 and the pair of engagement portions 306 provided in the housing 101 engage with each other to give a click feeling is several degrees (an angle in a range from 1 degree to 3 degrees).

In the example in FIG. 11, the opening angle θ1 at which the combined moment M3 obtained by combining the moment M1 and the moment M2 is zero is about 9 degrees. In order to increase the opening angle θ1 at which the combined moment M3 is zero, for example, the entire curve of the combined moment M3 may be shifted in the minus direction. To this end, for example, the absolute value of the moment M1 may be increased by increasing the self-weight of the cap unit 401 or elongating the lever 402 of the cap unit 401. In addition, the absolute value of the moment M2 may be decreased by decreasing the spring multiplier of the biasing unit 302. Conversely, in order to decrease the opening angle θ1 at which the combined moment M3 is zero, for example, the entire curve of the combined moment M3 may be shifted in the plus direction. To this end, for example, the absolute value of the moment M1 may be decreased by decreasing the self-weight of the cap unit 401 or shortening the lever 402 of the cap unit 401. In addition, the absolute value of the moment M2 may be increased by increasing the spring multiplier of the biasing unit 302.

Next, a function to turn the cap unit 401 from the uncapping position to the capping position by using a cover 102 will be described.

Figure 12C:
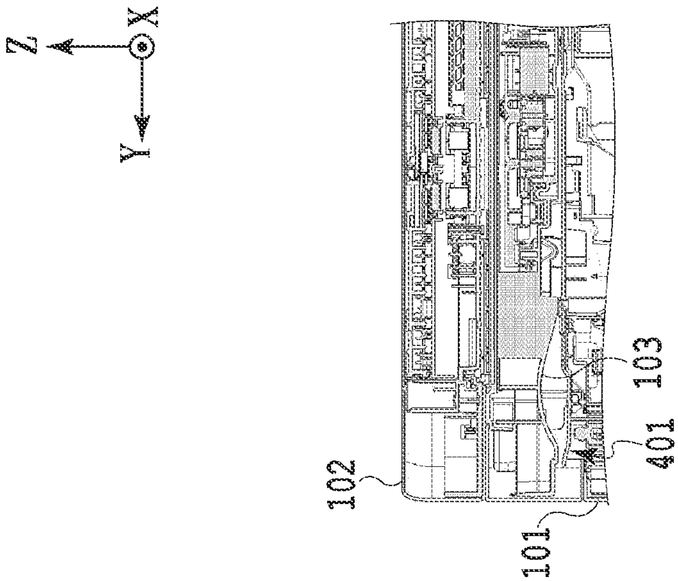
FIGS. 12A, 12B, and 12C are cross-sectional views taken along XII-XII in FIG. 2 in states where the cover is at a full-opened position, a half-opened position, and a closed position.
Figure 12B:
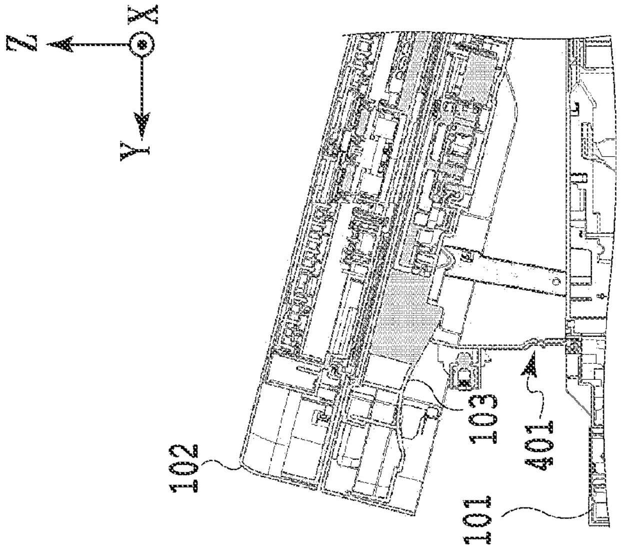
Figure 12A:
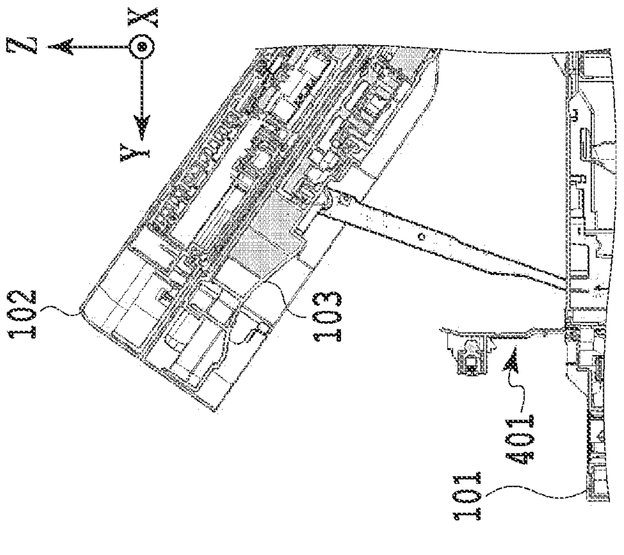

As illustrated in FIGS. 12A to 12C, the cover 102 includes a bottom surface 103 concave upward. FIG. 12A illustrates a state where the cover 102 is in an opened position and the cap unit 401 is at the uncapping position. As illustrated in FIG. 12B, when the cover 102 is turned at a predetermined angle in a direction toward a closed position while the cap unit 401 is left at the uncapping position, the bottom surface 103 comes into contact with the tip of the grip portion 405 of the cap unit 401. At this time, a portion of the bottom surface 103 around a contact point with the cap unit 401 is inclined in an upper front direction (in an upper left direction in FIG. 12B) as seen from the front of the main body. Meanwhile, an extending direction of the cap unit 401 is inclined to the vertical direction (Z-axis direction) with respect to the normal to the bottom surface 103 at the contact point of the bottom surface 103 with the cap unit 401. Then, when the cover 102 is further turned in the direction toward the closed position, the grip portion 405 of the cap unit 401 is pushed in the capping direction by the bottom surface 103. As a result, the cap unit 401 is turned in the direction toward the capping position.

FIG. 12C illustrates a state where the cover 102 is at the closed position and the cap unit 401 is at the capping position. Shortly before the cover 102 reaches the position in FIG. 12C from the position in FIG. 12B, the combined moment M3 has a direction to turn the cap unit 401 toward the capping position. For this reason, the cap unit 401 can turn to the capping position even if the grip portion 405 is not pushed by the bottom surface 103. Thus, if the grip portion 405 of the cap unit 401 is kept in contact with the bottom surface 103 up to a position where the moment M1 by the self-weight exceeds the moment M2 of the biasing force, then the cap unit 401 automatically turns to the capping position with the assistance of the combined moment M3.

However, in order that the cap unit 401 can completely turn to the capping position as illustrated in FIG. 12C, the force to cause the pair of engagement portions 417 to pass over the pair of engagement portions 306 is needed. In addition, the force to surpass resistance force that the lip portion 415 receives from the outer circumferential surface of the inlet port 211 is also needed. As such force, the force pushing the tip of the grip portion 405 of the cap unit 401 by the bottom surface 103 of the cover 102 is used. Accordingly, in a case where the cap unit 401 is turned to the capping position by the cover 102, the cap unit 401 is not turned to the position illustrated in FIG. 12C but is turned only to a position slightly shifted in the uncapping direction from the illustrated position. At that position, the tip of the grip portion 405 of the cap unit 401 is in contact with the bottom surface 103 of the cover 102. In this case, even in a state where the cover 102 is moved to the closed position, the tip of the cap unit 401 (the tip in the +Y direction in FIG. 12C) is out of contact with the housing 101 but the cap 403 is fitted to the inlet port 211. In a case where the cap unit 401 is turned to the capping position by a user's operation, the cap unit 401 can be turned to the position illustrated in FIG. 12C. At the position illustrated in FIG. 12C, a small gap is formed between the tip of the grip portion 405 of the cap unit 401 and the bottom surface 103 of the cover 102.

OTHER EMBODIMENTS

In the foregoing embodiment, when the cap unit 401 is at the uncapping position, the opening angle θ1 is about 90 degrees as illustrated in FIG. 9B. However, the opening angle θ1 of the cap unit 401 at the uncapping position may be changed to an angle larger than 90 degrees (such, for example, as 100 degrees or 110 degrees). When the uncapping position is set such that the angel θ2 formed between the horizontal line and the center of gravity Z1 is 90 degrees or larger, the moment M1 by the self-weight of the cap unit 401 at the uncapping position has a direction to move the cap unit 401 from the capping position to the uncapping position.

In the foregoing embodiment, the ink jet recording apparatus is described which supplies the inks stored in the ink tanks 210 to the recording head 204 via the supply tubes 209, and executes printing on a recording medium with the recording head 204. Instead, an ink or a liquid other than an ink may be stored in a certain liquid container equivalent to the ink tank 210. Then, the ink or the liquid other than the ink stored in the liquid container may be consumed by a certain liquid consuming apparatus for a purpose other than printing.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-158843, filed Sep. 30, 2022, which is hereby incorporated by reference wherein in its entirety.

What is claimed is:

1. A recording apparatus comprising:

a tank configured to store liquid to be supplied to a recording head that ejects the liquid, the tank including an inlet port for liquid injection;

a cap unit including a shaft portion and a cap configured to turn about the shaft portion between a first position at which the cap caps the inlet port and a second position at which the cap does not cap the inlet port, the shaft portion being provided to a housing that encloses the tank; and a biasing unit configured to bias the cap unit in a direction to move the cap apart from the inlet port, wherein the cap unit does not move at the second position while being biased by the biasing unit, and the cap unit includes a pair of ridges that protrude in directions toward both outer sides from the center in a width direction and extend in a longitudinal direction of the cap unit.

2. The recording apparatus according to claim 1, wherein in a case where the cap unit is at the first position, the cap unit maintains the first position with a self-weight of the cap unit opposing biasing by the biasing unit.

3. The recording apparatus according to claim 1, wherein in a case where the cap unit is at the first position, a combined moment obtained by combining an biasing moment of a force to turn the cap unit by the biasing unit with respect to an axial center of the shaft portion and a self-weight moment of a force to turn the cap unit by the self-weight of the cap with respect to the axial center has a direction to turn the cap unit in a capping direction from the second position toward the first position, and in a case where the cap unit is at the second position, the combined moment has a direction to turn the cap unit in an uncapping direction from the first position toward the second position.

4. The recording apparatus according to claim 3, wherein as the cap unit turns from the first position to the second position, the combined moment continuously changes from a first predetermined value having a direction to turn the cap unit in the capping direction to a second predetermined value having a direction to turn the cap unit in the uncapping direction.

5. The recording apparatus according to claim 4, wherein as the cap unit turns from the first position to a predetermined position between the first position and the second position, the combined moment monotonically changes from the first predetermined value having the direction to turn the cap unit in the capping direction to a third predetermined value having a direction to turn the cap unit in the uncapping direction.

6. The recording apparatus according to claim 3, wherein the cap unit stays at the first position with an equilibrium established between the combined moment and a moment of a contact force generated by contact of a first predetermined portion of the cap unit with a second predetermined portion of the housing, and the cap unit stays at the second position with an equilibrium established between the combined moment and a moment of a contact force generated by contact of a third predetermined portion of the cap unit with a fourth predetermined portion of the housing.

7. The recording apparatus according to claim 1, wherein the cap unit includes a lever and a cap loosely fitted in the lever, the cap unit is supported by the housing rotatably about the shaft portion in such a way that a predetermined portion near a first end of the lever is aligned with the shaft portion, the cap is arranged at a position shifted from a second end of the lever toward the first end of the lever by a predetermined distance, the second end being opposed to the first end, and in a case where the cap unit is at the first position, the cap caps the inlet port.

8. The recording apparatus according to claim 7, wherein a grip portion is provided to the second end of the lever.

9. The recording apparatus according to claim 1, wherein the cap unit includes a cap-unit-side engagement portion that engages with a housing-side engagement portion in a case where the cap unit is at the first position.

10. The recording apparatus according to claim 1, wherein in a case where the cap unit is at the first position, the pair of ridges included in the cap unit are held between a pair of ridges that are provided on both side surfaces of a recess of the housing in which the cap unit is housed and that protrude in directions from both outer sides toward the center in the width direction and extend in a turning direction of the cap unit.

11. The recording apparatus according to claim 1, wherein the biasing unit is a tension spring.

12. The recording apparatus according to claim 1, further comprising:

a cover that is provided above the housing and the cap unit and is turnable between a closed position at which the cover covers the housing and the cap unit, and an opened position at which the cover allows the housing and the cap unit to be exposed; and a recording head that executes printing on a recording medium with ink stored in the tank.

13. The recording apparatus according to claim 12, wherein if the cap unit is located at a position shifted from the first position toward the second position in a case where the cover is turned from the opened position to the closed position, the cover comes into contact with the cap unit and pushes the cap unit until the cap unit is moved to a position close to the first position, thereby causing the cap unit to cap the inlet port.

14. The recording apparatus according to claim 13, wherein the position close to the first position is a position at which a combined moment obtained by combining an biasing moment of a force to turn the cap unit by the biasing unit with respect to an axial center of the shaft portion and a self-weight moment of force to turn the cap unit by a self-weight with respect to the axial center has a direction to turn the cap unit in a capping direction from the second position toward the first position.

* * * * *